June 9, 1964  D. C. HUNTER  3,136,579
SAFETY SEAT
Filed Jan. 21, 1963

INVENTOR
DEAN C. HUNTER

BY *Richard H. Smith*
AGENT

United States Patent Office 3,136,579
Patented June 9, 1964

**3,136,579
SAFETY SEAT**
Dean C. Hunter, 849 Grandell Ave., Riverview Park,
Reading, Pa.
Filed Jan. 21, 1963, Ser. No. 252,758
4 Claims. (Cl. 297—250)

This invention relates to a safety seat, and, more particularly, to a safety seat for proecting young children against injury when such children are riding in moving vehicles.

In recent years safety belts have become a standard automobile accessory. There is no question that the number of personal injuries from sudden stops and loss of control of automobiles and fatalities due to serious accidents, such as collisions between automobiles, can be materially lessened by the widespread use of safety belts.

It is, however, an unfortunate fact that human nature often resists the use of such safety devices because of real or imagined inconvenience associated with them. This is particularly true in the case of children, especially children in the three to eight year-old bracket. Children of this age don't like to be fastened to the seat of an automobile where they can't see out of the windows. Trying to get a three-year-old just to sit down on the seat of a car is enough of a feat without additionally trying to strap him there. The problem is not solved when a conventional type of infant car-seat is brought into use because very often the child is too big to fit in it or he refuses to be associated in any way with such a "little baby's seat."

Conventional type car-seats tend to be undesirable from other standpoints also. While they serve to elevate the child so that he can see out of the car, they are usually attachable only to the back or some other part of the automobile seat. This does not give as much protection as does the standard safety belt which is firmly secured to the floor or the frame of the automobile. In addition, conventional infant car-seats are often large and cumbersome, making their installation in and removal from the automobile a difficult and bothersome operation. Expense tends to be a further drawback of many such car-seats.

The unfortunate consequence of the present situation is that most young children are allowed to roam around inside of a moving automobile unprotected from the injury which they are almost certain to sustain if the automobile is caused to brake suddenly or is involved in an accident.

It is therefore an object of the present invention to provide a safety seat in which young children may be made to sit with a minimum amount of objection on their part.

Another object is to provide a child's safety seat which gives the same degree of protection from injury as does the standard automobile safety belt.

A further object is to provide a child's safety seat which is compact, simple and convenient to use, and extremely inexpensive.

In accordance with the present invention a seat member is provided which elevates the occupant so that he may better see out of an automobile and which coacts with a standard automobile safety belt in a manner allowing both the occupant and the seat member to be secured directly by the safety belt.

The foregoing and other objects, features and advantages of the invention will be apparent from the following more particular description of a preferred embodiment of the invention, as illustrated in the accompanying drawings.

Figure 1:
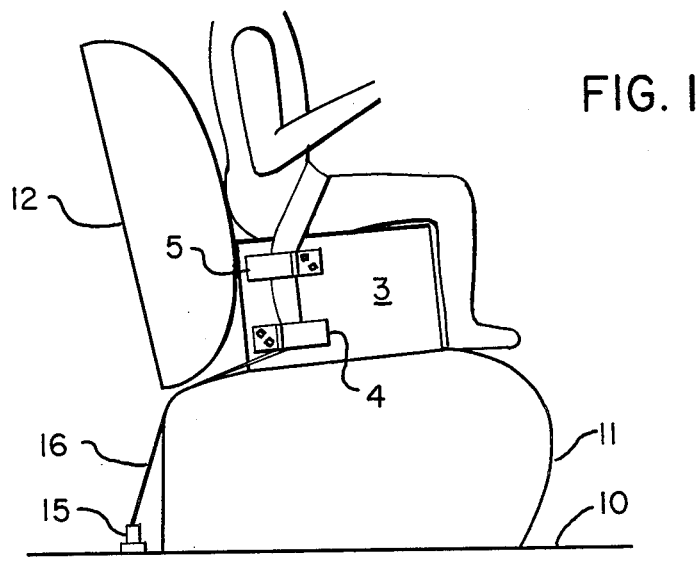
FIG. 1 is a diagram illustrating the coaction between the various elements of a preferred embodiment of the present invention.

With reference now to the drawings, a detailed description of the preferred embodiment will be given. FIG. 1 shows an automobile seat structure comprising a seat portion 11 and a back portion 12. This seat structure may be of the type found in any automobile and is fixed to the floor 10 of the automobile in a common fashion.

Associated with the seat structure is a safety belt 16. The belt is fastened in a well-known manner at its lower end to the floor 10 by a fixture 15. It consists of two halves, each half having its own floor connection and extending through the space in the seat structure between the seat portion 11 and the back 12. A standard safety belt buckle arrangement is provided on the free ends of the two belt halves so that they may be placed around the upper leg portions of a person sitting in the seat structure and then buckled together, acting to restrain the person from being thrown about inside the automobile in the event of a sudden stop or accident. The safety belt 16 is also provided with a well-known length adjusting feature. This allows effective utilization of the belt by persons of different size and permits unimpeded adjustment of the relative forward position of the seat structure.

Supported on the seat portion 11 of the seat structure is a supplemental seat member 3. This seat member is the basic element of the present invention and will hereinafter be described in detail with joint reference to FIGS. 1 and 2. As depicted in FIG. 1, the supplemental seat member 3 serves as an elevated platform upon which a person such as a small child may sit. It provides the child with a vantage point from which he may see out of the windows of the automobile.

Figure 2:
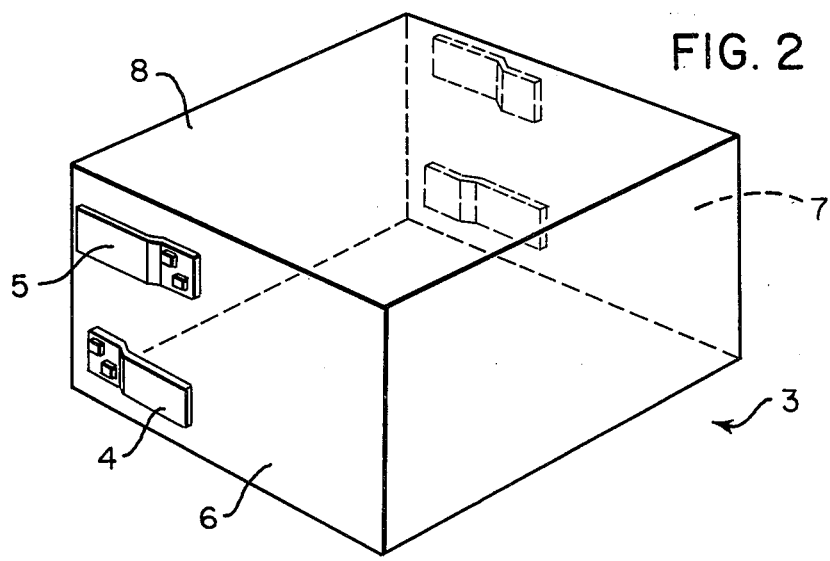
FIG. 2 is a perspective drawing of a preferred embodiment of the seat member of the present invention.

As shown in FIG. 2, the seat member 3 is essentially a box-shaped element including a top surface 8 and two side surfaces 6 and 7. It may be constructed of any material having sturdy and lasting qualities. It has been found that ½-inch plywood sheets, when screwed together to form the structure of FIG. 2, give excellent results.

Mounted on each of the side surfaces 6 and 7 are two open-ended brackets 4 and 5. As indicated in FIG. 2 each of these brackets is attached at one of its ends to the associated side surface 6 or 7. Bolts or other suitable fastening means may be used to so attach the brackets. There is a small offset bend in each of the brackets so that the free ends of the brackets run parallel to and are slightly spaced away from the adjacent side surface of the seat member. It has been found advantageous to make the offset bend of such a size that the space between the offset portion of the bracket and the adjacent side surface is somewhat greater than the thickness of the safety belt to allow easy threading of the belt through the brackets.

The lower bracket 4 on each side surface is positioned with its open end facing toward the front of the seat member. The upper bracket 5 is positioned in the reverse direction. With this arrangement the safety belt 16 may be threaded through the brackets as shown in FIG. 1 so that there is no danger of the belt slipping out of position once it is fastened. Such a bracket arrangement also allows easy threading of the belt, there being no holes or eyes to pull the belt through.

Installation of the seat member 3 is simply a matter of placing it on the seat portion 11 of the automobile seat and hooking the two halves of the safety belt through the brackets on either side of the seat member. When a child sits as in FIG. 1, and the belt is buckled firmly about him, there is created a taut interconnection of all the elements of the present invention and no dangerous slippage or breakage can occur in the event of the application of high forward forces such as are created in an automobile accident. Further, there is no possibility that the seat member 3 might work its way out from underneath the child. Thus, the child can sit in a desirable elevated position and have the same degree of protection which he would have if he were sitting directly on the automobile seat. His elevated position allows him to see out the windows of the automobile and thus provides him with a source of interest and amusement not available when he is sitting directly on the seat of the automobile. Further, the child is likely to prefer the safety seat of the present invention to conventional types of infant seats because he gets to use the same kind of safety belt that the "grown-ups" use. This being so the child is more easily persuaded to use and to stay in the present safety seat.

While the seat member of the above described preferred embodiment of the invention has been characterized as essentially a box-shaped element, it is to be understood that changes may be made in its shape and features may be added to it without departing from the spirit and scope of the invention. Such additions to the seat member may comprise back and armrest structures, upholstery, and other various features designed to increase its comfort, attractiveness to children, or purchase appeal.

What is claimed is:

1. In combination with a seat structure and an associated safety belt, said belt being adapted to engage and secure a person in said seat structure, supplemental seat means for supporting said person, said supplemental seat means being supported by said seat structure and comprising a seat portion, two side supports adjoining said seat portion, and two open-ended brackets mounted on each of said side supports for engaging said safety belt when said belt is engaging said person, said brackets being positioned one above the other with their open ends facing, respectively, toward the rear and toward the front of said supplemental seat means, said person and said supplemental seat means thereby both being secured in said seat structure by said safety belt.

2. In a safety seating arrangement wherein a safety belt is adapted to engage and secure a person in a seat structure, a supplemental seat device comprising, in combination, a support member, including two side panels, for supporting said person in an elevated position on said seat structure, and two open-ended brackets mounted on each of said side panels for engaging said seat belt when said belt is engaging said person, said brackets being positioned one above the other with their open ends facing, respectively, toward the rear and toward the front of said support member, said person and said support member thereby both being secured in said seat structure by said safety belt.

3. In combination with a forward-facing vehicle seat structure and an associated safety belt, said belt being adapted to engage and secure a person in said seat structure, supplemental seat means for supporting said person, said supplemental seat means being supported by said seat structure and comprising a seat portion, two side supports adjoining said seat portion, and bracket means mounted on each of said side supports for engaging said safety belt when said belt is engaging said person, said bracket means being adapted to receive said belt without an end of said belt having to be put through said bracket means and including a portion for preventing forward movement of said belt relative to said supplemental seat means and a portion for preventing forward movement of said supplemental seat means relative to said belt, said person and said supplemental seat means thereby both being secured in said seat structure by said safety belt.

4. In a safety seating arrangement wherein a safety belt is adapted to engage and secure a person in a forward-facing vehicle seat structure, a supplemental seat device comprising, in combination, a support member, including two side panels, for supporting said person in an elevated position on said seat structure, and bracket means mounted on each of said side panels for engaging said seat belt when said belt is engaging said person, said bracket means being adapted to receive said belt without an end of said belt having to be put through said bracket means and including a portion for preventing forward movement of said belt relative to said support member and a portion for preventing forward movement of said support member relative to said belt, said person and said support member thereby both being secured in said seat structure by said safety belt.

References Cited in the file of this patent

UNITED STATES PATENTS

| | | |
|---|---|---|
| 2,625,987 | Hunter | Jan. 20, 1953 |
| 2,665,143 | Rasmussen | Jan. 5, 1954 |
| 2,710,649 | Griswold et al. | June 14, 1955 |
| 2,777,502 | Travis | Jan. 15, 1957 |
| 2,947,353 | Von Wimmersperg | Aug. 2, 1960 |
| 2,953,189 | Barash | Sept. 20, 1960 |

FOREIGN PATENTS

| | | |
|---|---|---|
| 777,981 | Great Britain | July 3, 1957 |